United States Patent [19]

Ueno et al.

[11] Patent Number: 5,352,059
[45] Date of Patent: Oct. 4, 1994

[54] SYNTHETIC RESIN BALL JOINT WITH REINFORCING RIB

[75] Inventors: Atsushi Ueno; Yoshimichi Kamiyama, both of Fujisawa; Tatsuyoshi Tsuji, Aichi; Toshirou Tanaka, Utsunomiya, all of Japan

[73] Assignees: Musashi Seimitsu Kogyo Company Ltd., Toyohashi; Oiles Corporation, Tokyo, both of Japan

[21] Appl. No.: 808,313

[22] Filed: Dec. 16, 1991

[30] Foreign Application Priority Data

Feb. 14, 1991 [JP] Japan .................. 3-040727

[51] Int. Cl.⁵ .......................................... F16C 11/06
[52] U.S. Cl. ................................. 403/122; 403/132; 403/56; 403/134; 280/674
[58] Field of Search ............... 403/132, 133, 134, 135, 403/56, 122; 280/674, 689

[56] References Cited

U.S. PATENT DOCUMENTS

| 311,558 | 2/1885 | Arnold | 403/56 |
|---|---|---|---|
| 1,409,954 | 3/1922 | Johnston | 403/122 X |
| 3,408,124 | 10/1968 | Melton et al. | 403/133 X |
| 5,092,703 | 3/1992 | Kobayashi | 403/56 |
| 5,152,628 | 10/1992 | Broszat et al. | 403/122 X |
| 5,282,396 | 2/1994 | Crandall | 403/132 X |

FOREIGN PATENT DOCUMENTS

| 806438 | 12/1936 | France . | |
|---|---|---|---|
| 1432903 | 2/1966 | France | 403/134 |
| 63-13912 | 1/1988 | Japan | 403/133 |
| 355616 | 8/1931 | United Kingdom . | |
| 603831 | 6/1948 | United Kingdom | 280/674 |

Primary Examiner—Randolph A. Reese
Assistant Examiner—George D. Spisich
Attorney, Agent, or Firm—Armstrong, Westerman, Hattori, McLeland & Naughton

[57] ABSTRACT

A synthetic resin connecting rod is disclosed having a ball socket integrally formed with an opening on one side and a concave spherical surface extending from the opening at each end of the rod. In order to increase the strength, the connecting rod has a rib as a reinforcement on the connecting line between the centers of each spherical surface, the connecting line intersecting a transverse cross section of the rib. A ball joint using the preferred synthetic resin connecting rod is lighter than one using a metal rod and is strong enough to be used as a ball joint for a stabilizer in an automobile.

21 Claims, 4 Drawing Sheets

Fig.4
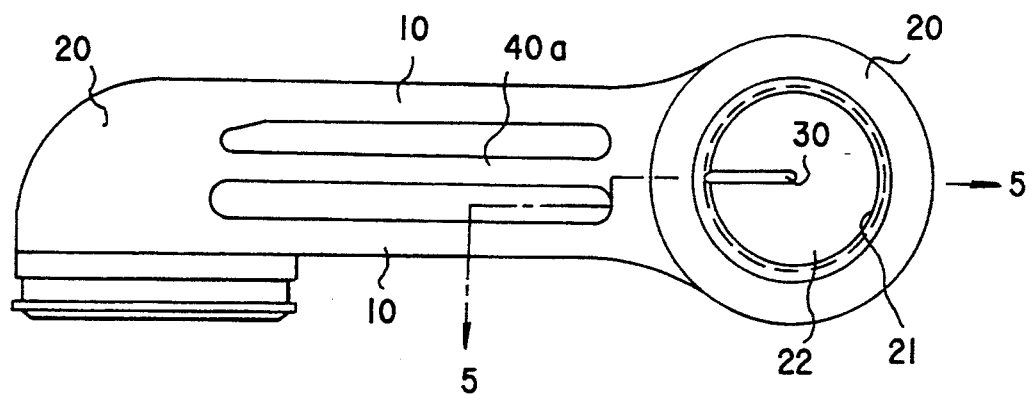
Fig.5
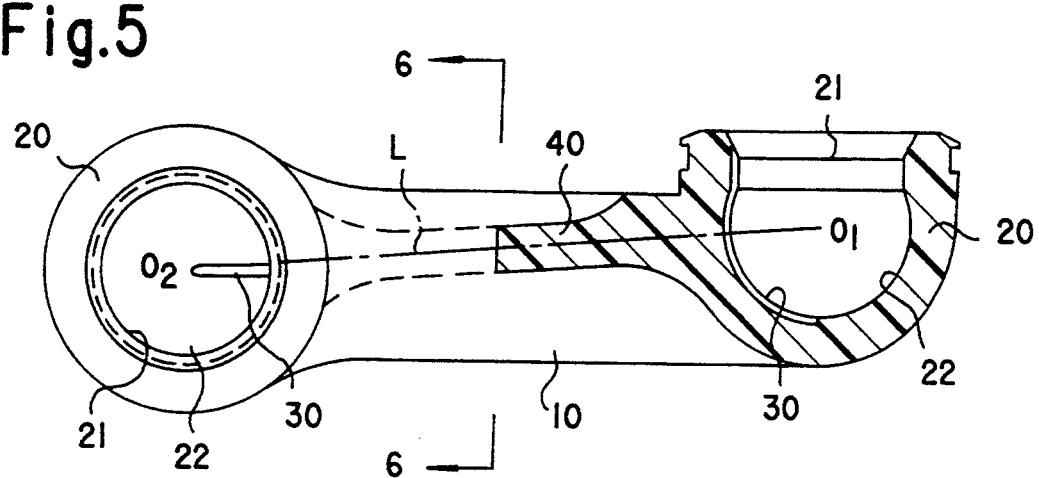
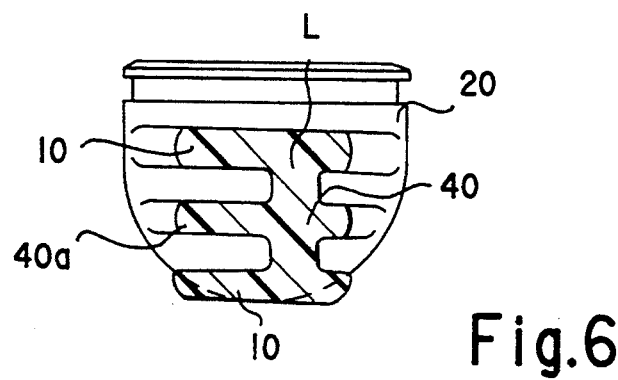
Fig.6

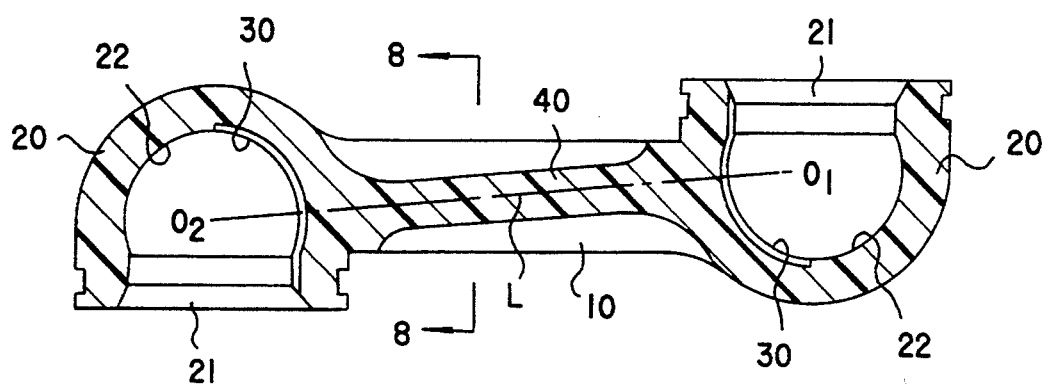
Fig.7
Fig.8
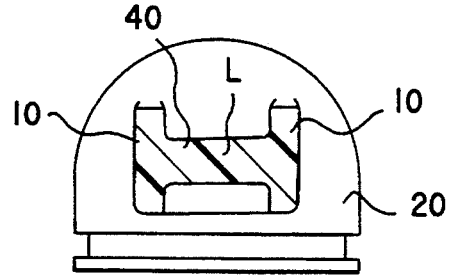
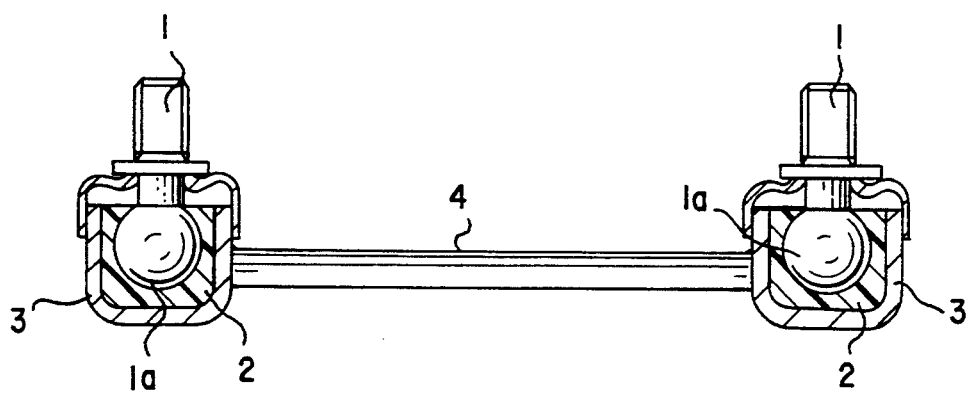
Fig.11
PRIOR ART

SYNTHETIC RESIN BALL JOINT WITH REINFORCING RIB

BACKGROUND OF THE INVENTION

1. Field of the Invention

This invention relates to a ball joint for an automobile stabilizer, more particularly for connecting a stabilizer rotatably installed on the body of an automobile, to a suspension arm.

The purpose of the automobile stabilizer is to increase the traveling stability of the automobile by creating a resistant force against a rolling motion of the automobile body such as due to sharp turning of the automobile. To reduce the rolling motion of the automobile body, the stabilizer has a U-shaped torsion bar spring installed between the suspension arm and the automobile body to compensate for vertical vibration. Generally, the center part of the U-shape bar is used as the torsion bar spring, the center part being rotatably connected to the automobile body via a rubber cushion or rubber bush. Each end of the U-shaped bar is connected to a suspension arm through a ball joint.

2. Description of the Related Art

Referring to FIG. 11, there is shown an example of a ball joint for connecting each end of the arm of the stabilizer with a suspension arm. The ball joint consists of two metal sockets 3 which include synthetic resin ball seats 2 inside for rotatably holding ball heads 1a of ball studs 1, and a connecting rod 4 which connects both sockets 3 together. One ball stud of this ball joint is installed on one end of a stabilizer arm and the other ball stud of this ball joint is connected to a suspension arm to transmit the input from a wheel to the stabilizer.

However, the type of the ball joint explained above suffers from a number of deficiencies. For example, the ball joint sockets need to be fixed to the connecting rod 4 by welding, thus requiring additional manufacturing time and expense. In addition, the ball joint is rather heavy because it is made of metal, thus affecting the overall weight of the automobile in which it is installed. U.S. Pat. No. 4,260,275, U.S. Pat. No. 4,283,833, and GB Patent No. 1,302,871 are examples of welded-types of ball joints.

SUMMARY OF THE INVENTION

An object of the present invention is to provide a total synthetic resin ball joint, except for the ball studs, for overcoming the above-noted problems of high manufacturing cost and heavy weight, by:

1. Keeping the thickness of the ball joint as even as possible;
2. Providing a rib at a strategic place for reinforcement;
3. Providing a means to prevent a ball head of a ball stud from slipping out of the concave spherical surface of the socket through the opening of the socket; and
4. Using a synthetic resin, such as polyacetal resin, polyamide resin, or thermoplastic polyester, for making the resin ball joint.

To achieve these and other objects, a ball head of a ball stud, which also consists of a stud part, is fixed within a concave spherical surface of each of the pair of sockets which are formed at each end of, and integrally with, a synthetic resin connecting rod. The stud part of each ball stud projects out through an opening of the socket, one of the ball studs being connected to the end of a stabilizer, and the other stud being connected to a suspension arm.

If the stabilizer is connected to the suspension arm via the ball joint in this way, then when a force is exerted due to a rolling motion of the automobile body, a rotational moment acts on the ball joint around an axis extending through each spherical center of the sockets. However, because the synthetic resin ball joint has a reinforcement rib along the axis between the centers of each spherical surface the stiffness of the ball joint is high enough to transmit the force due to the rolling motion, to the stabilizer without the ball joint being damaged by the rotational force.

Furthermore, a groove formed on the concave spherical surface of the socket acts as a release for air remaining in the inside of the socket when a ball stud is fixed therein during assembly. The groove also can function as a pool for grease or lubricating oil when the ball joint is installed in the automobile.

BRIEF DESCRIPTION OF THE DRAWINGS

This invention may be better understood and its numerous objects and advantages will become apparent to those skilled in the art by reference to the accompanying drawings wherein:

FIG. 4 is a horizontal projection which shows a second embodiment of the ball joint for a stabilizer;

FIG. 5 is a cross sectional view of the synthetic resin connecting rod, viewed along the plane b—b of FIG. 4;

FIG. 6 is a cross sectional view of the synthetic resin connecting rod, viewed along the plane c—c of FIG. 5;

FIG. 7 is a horizontal projection which shows a third embodiment of the ball joint for a stabilizer;

FIG. 8 is a cross sectional view of the synthetic resin connecting rod, viewed along the plane d—d of FIG. 7;

FIG. 11 is a longitudinal section of a conventional ball joint for a stabilizer.

DETAILED DESCRIPTION OF THE PREFERRED EMBODIMENTS

Figure 1:
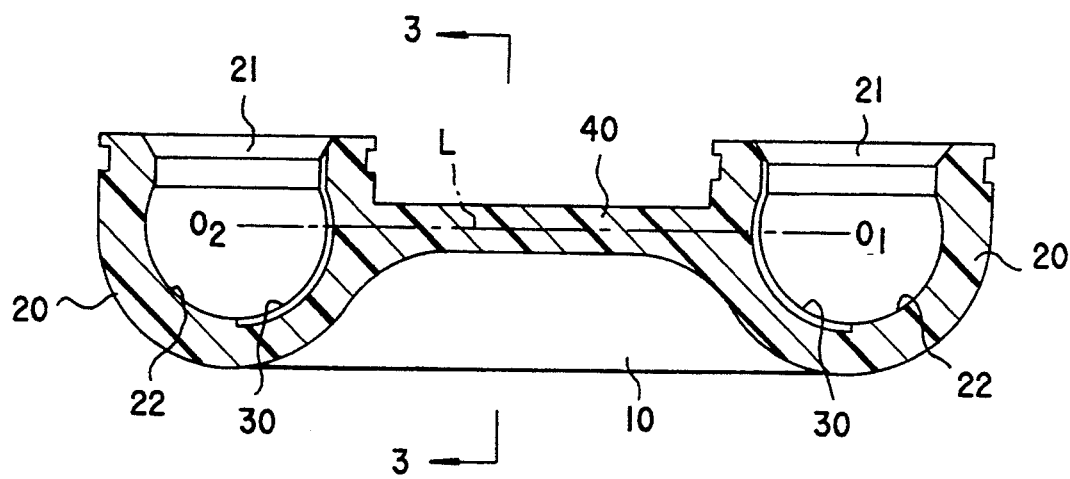
FIG. 1 is a longitudinal sectional plan which shows a first embodiment of the ball joint for a stabilizer.
Figure 2:
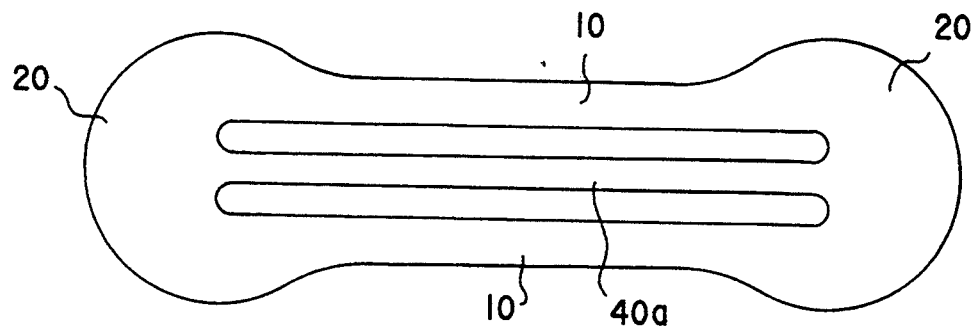
FIG. 2 is a bottom view of the synthetic resin connecting rod of FIG. 1.
Figure 3:
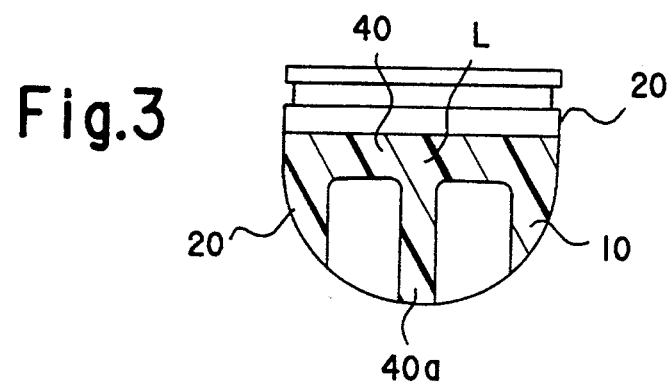
FIG. 3 is a cross sectional view of the synthetic resin connecting rod, viewed along the plane a—a of FIG. 1.

FIGS. 1, 2, and 3 show the first embodiment of a ball joint for an automobile stabilizer. The connecting rod 10 is made of a synthetic resin. A pair of sockets 20, which are formed at each end of, and integrally with the rod 10, each have an opening 21 and a concave spherical surface 22 inside. A concave groove 30 is formed on the concave spherical surface 22 of the socket 20 from the bottom of surface 22 to the opening 21 on the connecting rod side.

The grooves 30 are formed on the connecting rod side because when the rod 10 and a pair of sockets 20 are formed, normally by injection molding, the side opposite to the connected point of socket 20 and rod 10 is a weld part of fused synthetic resin. Forming a concave groove on the weld part would decrease the strength of the socket 20.

A reinforcement rib 40 is integrally formed with the connecting rod 10 and each socket 20. The rib extends along the connecting line L between spherical center 01 and spherical center 02 of the respective sockets (the connecting line L intersecting a transverse cross section of rib 40). A rib 40a is integrally formed with reinforcement rib 40 and each socket.

FIGS. 4, 5, and 6 show the second embodiment of a ball joint for an automobile stabilizer, which is similar to the first embodiment of the ball joint but with one socket 20 formed having an opening turned 90 degrees with respect to the opening of the other socket.

FIGS. 4–6 show a socket 20, which has an opening 21 at one side and a concave spherical surface extending from the opening, formed at one end of a synthetic resin connecting rod 10'. At the other end of the connecting rod 10', a socket 20 is formed as an extension of an opening at a right angle to that of the opening of the socket. The center point 01 of the spherical surface 22 is offset from the center point 02 of the spherical surface 20 of the other socket.

Concave groove 30 is formed on the concave spherical surface 22 of the socket 20 from the bottom to an opening 21 at the connecting rod side. The connecting line L extends between the spherical center points 01 and 02, and intersects a transverse cross section of the rib 40'. A rib 40a is integrally formed with the reinforcement rib 40' and each socket.

The third embodiment is shown in FIGS. 7 and 8. This ball joint for an automobile stabilizer, is similar to the first embodiment of the ball joint, but with one of the sockets 20 formed to have an opening turned 180 degrees to the opening of the other socket. In FIGS. 7 and 8, socket 20, which has an opening 21 at one side and a concave spherical surface 22 extending from the opening, is formed at one end of a synthetic resin connecting rod 10''.

At the other end of the connecting rod 10'', a socket 20 is formed having an opening whose surface is parallel to the surface of the opening of the other socket 20. The opening of one socket is on the opposite side of the opening of the other socket, and a center 01 of the concave spherical surface 22 is offset from the center 02 of the concave spherical surface 22 of the other socket.

Concave groove 30 is formed on the concave spherical surface 22 of the socket 20 from the bottom to an opening 21 at the connecting rod side. The connecting line L extends between the spherical center points 01 and 02, and intersects a transverse cross section of the rib 40''.

Figure 9:
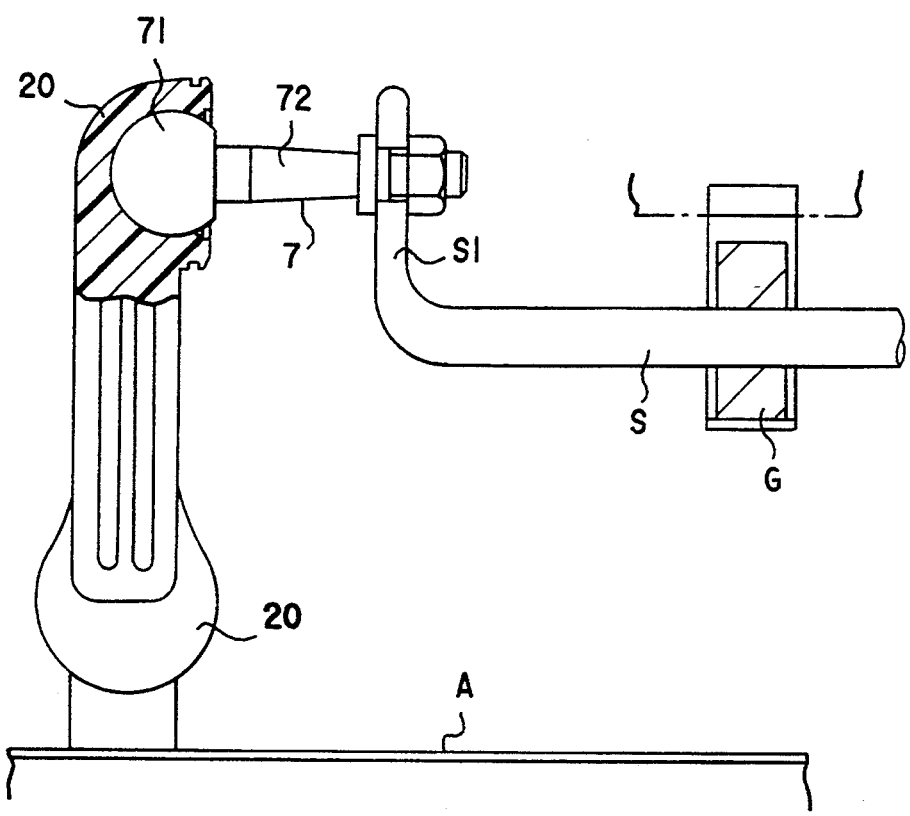
FIG. 9 is a fragmented longitudinal section of the ball joint for a stabilizer in an installation condition.

Referring now to FIG. 9, the ball joint explained above is shown connecting a stabilizer and a suspension arm. In this figure, the ball joint of the second embodiment is used as an example. A ball stud 7 is fitted into a socket 20 formed at each end of the synthetic resin connecting rod 10'. The ball head 71 is then in contact with the concave spherical surface 22, and the stud part 72 is projected through an opening 21.

One of the ball studs 7 is fixed at stud part 72 to the end of arm S1 of the stabilizer S, which is also connected to the automobile body through rubber cushion G and tightened by a nut. The other ball stud 7 is fixed to the suspension arm A at its stud part 72 and tightened by a nut.

When the stabilizer is connected by the ball joint in this way, and when a rotational force, caused by a rolling movement of the automobile, is exerted on the ball joint, around connecting line between each spherical center 01, 02 of the spherical surface 22 of each socket. However, since the ball joint has a rib 40' as a reinforcement on the line extending between the spherical centers 01, 02 of the spherical surface 22, and the imaginary line L intersects the transverse cross section of the rib 40', the stiffness of the ball joint is high enough to transmit the rolling force to a stabilizer without sustaining any damage by the rotational moment.

Figure 10:
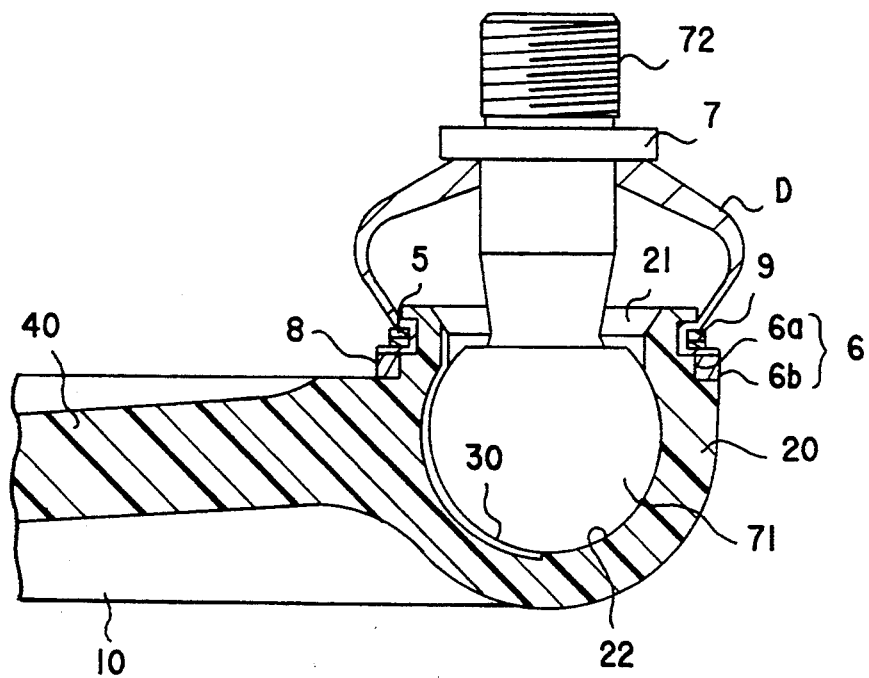
FIG. 10 is a longitudinal sectional plan which shows another embodiment of the ball joint for a stabilizer.

FIG. 10 is an example of a ball joint of any of the preferred first, second or third embodiments having a means for restricting expansion of a socket opening. The following is an explanation of such a means on a ball joint with reference to the second embodiment.

A synthetic resin socket 20, which is formed at each end of the connecting rod 10, has a concave circular groove 5 on the outside surface, and a circular step 6, which consists of a cylindrical surface 6a and circular horizontal plane 6b, circular step 6 being formed adjacent groove 5.

A ball stud member 7, which consists of a ball head 71 and stud part 72, is inserted through an opening 21 of each socket to fit the ball head 71 in the concave spherical surface 22 of the socket 20, with the stud part 72 projecting out of the opening 21.

Metal ring 8 is fitted on the cylindrical surface of the circular step 6 formed on each socket 20 with its end surface touching the horizontal plane 6b. A dust seal D, one end of which is fitted on the outer surface of stud part 72 of the ball stud, is fitted with a tightening clip 9 within the circular groove 5 adjacent circular step 6 with a tightening clip 9.

The tightening clip 9, fixed on one end of the dust seal D, is placed with its outside surface outside of the inside surface of a metal ring 8 fitted in the circular step 6. More particularly, the center of tightening clip 9 can be placed directly above the vertical contact area between the metal ring 8 and the circular step 6.

In this layout, the tightening clip 9 plays a role as a stopper which prevents metal ring 8 fitted on the circular step 6 from coming off in the direction of the stud part 72 of ball stud 7. The tightening clip 9 works as a stopper even when there is an opening between the metal ring 8 and the circular step 6 caused by shrinkage of socket 20 due to stress alleviation.

In conclusion, in the layout shown in FIG. 10, the opening 21 of socket 20 has greatly increased strength in a diametrical direction when metal ring 8 is fitted on the circular step 6 on the outside surface of the socket. The metal ring 8 acts as a resistance to the stress of the pulling out of ball stud 7. In other words, expansion of an opening 21 is prevented and, therefore, the pulling out of the ball stud is prevented.

The preferred ball joint explained above achieves the following results:

1. As the synthetic resin ball joint is formed, its thickness is kept as constant as possible to eliminate bubbles or incomplete fillet. The synthetic resin ball joint has a reinforcement rib on the connecting line intersecting the transverse cross section of the rib and extending between each centerpoint of the concave spherical surfaces of the sockets. The ball joint transmits the rotational force caused by the roll of the automobile body, the force being transmitted to the stabilizer without the ball joint being damaged.

2. A concave groove formed on the concave spherical surface of the socket functions as a passage for air in the spherical surface when a stud is pressed into the socket when assembled; therefore, it is easy to fix the ball head within the spherical surface. Also, the groove is formed on the connecting rod side of the spherical surface so it does not decrease the strength of the socket.

3. By fixing the metal ring at the upper side of the outside surface of the socket, radial expansion of the opening is limited. This prevents the ball head fixed on the spherical surface from pulling out through the opening.

4. The socket of the preferred ball joint also works as a ball seat member for a present ball joint of present technology. This reduces the total weight of the ball joint as well as the number of components.

It is understood that various other modifications will be apparent and will be readily made by those skilled in the art without departing from the scope and spirit of this invention. Accordingly, it is not intended that the scope of the claims appended hereto be limited to the description as set forth herein, but rather that the claims be construed as encompassing all of the features of patentable novelty that reside in the present invention, including all features that would be treated as equivalents thereof by those skilled in the art to which this invention pertains.

What is claimed is:

1. A ball joint for connecting a stabilizer, which is installed rotatably in an automobile body, to a suspension arm, the ball joint comprising:
   a synthetic resin connecting rod;
   a pair of sockets formed at each end of, and integral with, the connecting rod to form an integral structure, each socket having an opening and a concave spherical surface extending from the opening on a first side of each socket, each concave spherical surface having a center point;
   a reinforcement rib formed in said integral structure on a connecting line extending between the center points of each concave spherical surface, said connecting line intersecting a transverse cross section of the reinforcement rib; and
   a concave groove extending from the bottom of each concave spherical surface to the respective opening of each socket for the passage of air during the insertion of a stud into the socket, said concave groove provides a space between the stud and the socket after the insertion;
   wherein the ball joint further comprises a second rib said second rib formed integrally with and perpendicularly to said reinforcement rib.

2. The ball joint of claim 1, further comprising:
   a circular concave groove on the outer surface of each opening;
   a dust seal having a first side fitting within said circular groove, wherein a second side of the seal is fixable to an outside surface of a ball stud;
   a circular step adjacent the concave groove; and
   a metal ring attached to said circular step.

3. The ball joint of claim 2, further comprising:
   a tightening clip placed on the dust seal at the groove, the outside diameter of the clip being larger than the inside diameter of the metal ring so that the tightening clip prevents the metal ring from slipping off in the ball stud direction.

4. The ball joint of claim 3, wherein the center of said tightening clip is directly above a vertical contact area between said metal ring and said circular step.

5. The ball joint of claim 1, wherein said concave groove extends from the bottom of each concave spherical surface to the side of the socket opening adjacent said connecting rod.

6. The ball joint of claim 1, wherein the synthetic resin for forming said integral structure is selected from the group consisting of polyacetal resin, polyamide resin, and thermoplastic polyester.

7. The ball joint of claim 1, wherein the openings of the first and second sockets face in the same direction.

8. A ball joint for connecting a stabilizer, which is installed rotatably in an automobile body, to a suspension arm, the ball joint comprising:
   a synthetic resin connecting rod;
   a first socket formed at one end of, and integral with, the rod to form an integral structure, the first socket having an opening and a first socket concave spherical surface extending from the opening on a first side of the first socket the first socket concave spherical surface having a center point;
   a second socket formed at the other end of, and integral with, the rod in said integral structure, the second socket having a opening at a right angle to the opening of the first socket, and a second socket concave spherical surface extending from the opening, the second socket concave spherical surface having a center point;
   a concave groove extending from the bottom of each concave spherical surface to the respective opening of each socket for the passage of air during the insertion of a stud into the socket, said concave groove provides a space between the stud and the socket after the insertion; and
   a reinforcement rib formed in said integral structure as a reinforcement on a connecting line extending between the center points of each concave spherical surface, said connecting line intersecting a transverse cross section of the rib;
   wherein the synthetic resin connecting rod defines a center axis which axis extends non-parallel to the connecting line extending between the center points of each concave spherical surface;
   wherein the ball joint further comprises a second rib, said second rib formed integrally with and perpendicularly to said reinforcement rib.

9. The ball joint of claim 8, further comprising:
   a circular concave groove on the outer surface of each opening;
   a dust seal having a first side fitting within said circular groove, wherein a second side of the seal is fixable to an outside surface of a ball stud;
   a circular step adjacent the concave groove; and
   a metal ring attached to said circular step.

10. The ball joint of claim 9, further comprising:
    a tightening clip placed on the dust seal at the groove, the outside diameter of the clip being larger than the inside diameter of the metal ring so that the tightening clip prevents the metal ring from slipping off in the ball stud direction.

11. The ball joint of claim 10, wherein the center of said tightening clip is directly above a vertical contact area between said metal ring and said circular step.

12. The ball joint of claim 8, wherein said concave groove extends from the bottom of each concave spherical surface to the side of the socket opening adjacent said connecting rod.

13. The ball joint of claim 8, wherein the synthetic resin for forming said integral structure is selected from the group consisting of polyacetal resin, polyamide resin, and thermoplastic polyester.

14. The ball joint of claim 8, wherein the center axis and connecting line are non-intersecting.

15. A ball joint for connecting a stabilizer, which is installed rotatably in an automobile body, to a suspension arm, the ball joint comprising:
a synthetic resin connecting rod;
a first socket formed at one end of, and integral with, the rod to form an integral structure, the first socket having a first opening and a first concave spherical surface extending from the first opening on a first side of the first socket, the first socket concave spherical surface having a center point;
a second socket formed at the other end of, an integral with, the rod in said integral structure, the second socket having a second opening facing 180 degrees from the first opening of the first socket, wherein each opening defines a plane, the planes being parallel to each other, the second socket having a second socket concave spherical surface extending from the second opening, the second socket concave spherical surface having a center point; a concave groove extending from the bottom of each concave spherical surface to the respective opening of each socket for the passage of air during the insertion of a stud into the socket, said concave groove provides a space between the stud and the socket after the insertion; and
a reinforcement rib formed in said integral structure, as a reinforcement on a connecting line extending between the center points of each concave spherical surface, said connecting line intersecting a transverse cross section of the rib wherein the synthetic resin connecting rod defines a center axis which axis extends non-parallel to the connecting line extending between the center points of each concave spherical surface;
wherein the ball joint further comprises a second rib, said second rib formed integrally with and perpendicularly to said reinforcement rib.

16. The ball joint of claim 15, further comprising:
a circular concave groove on the outer surface of each opening;
a dust seal having a first side fitting within said circular groove, wherein a second side of the seal is fixable to an outside surface of a ball stud;
a circular step adjacent the concave groove; and
a metal ring attached to said circular step.

17. The ball joint of claim 16, further comprising:
a tightening clip placed on the dust seal at the groove, the outside diameter of the clip being larger than the inside diameter of the metal ring so that the tightening clip prevents the metal ring from slipping off in the ball stud direction.

18. The ball joint of claim 17, wherein the center of said tightening clip is directly above a vertical contact area between said metal ring and said circular step.

19. The ball joint of claim 15, wherein said concave groove extends from the bottom of each concave spherical surface to the side of the socket opening adjacent said connecting rod.

20. The ball joint of claim 15, wherein the synthetic resin for forming said integral structure is selected from the group consisting of polyacetal resin, polyamide resin, and thermoplastic polyester.

21. The ball joint of claim 15, wherein the connecting rod axis and the connecting line intersect substantially in the middle between the concave spherical surfaces.

* * * * *